(12) United States Patent
Christenbury et al.

(10) Patent No.: US 7,096,907 B2
(45) Date of Patent: *Aug. 29, 2006

(54) RUN-FLAT SUPPORT RING WITH INTEGRATED SHELF DESIGN AND IMPROVED MOUNTING FEATURES

(75) Inventors: Damon L. Christenbury, Fountain Inn, SC (US); Steven A. Smith, Piedmont, SC (US)

(73) Assignee: Michelin Recherche et Technique S.A., (CH)

( * ) Notice: Subject to any disclaimer, the term of this patent is extended or adjusted under 35 U.S.C. 154(b) by 133 days.

This patent is subject to a terminal disclaimer.

(21) Appl. No.: 10/863,155

(22) Filed: Jun. 8, 2004

(65) Prior Publication Data

US 2005/0269006 A1 Dec. 8, 2005

(51) Int. Cl.
*B60C 17/00* (2006.01)
*B60C 17/04* (2006.01)

(52) U.S. Cl. .................. 152/516; 152/152; 152/520; 428/98; 428/156

(58) Field of Classification Search ............... 152/152, 152/516, 520
See application file for complete search history.

(56) References Cited

U.S. PATENT DOCUMENTS

| | | | |
|---|---|---|---|
| 6,598,633 B1 * | 7/2003 | Pompier et al. ............ 152/158 |
| 2002/0124924 A1 | 9/2002 | Abinal et al. | |
| 2003/0005991 A1 | 1/2003 | Drap | |
| 2003/0209301 A1 | 11/2003 | Pompier et al. | |

* cited by examiner

*Primary Examiner*—Justin R. Fischer
(74) *Attorney, Agent, or Firm*—Dority & Manning PA

(57) ABSTRACT

A run-flat support ring, which is a component mounted upon a rim inside a tire to extend the distance the tire may travel at reduced or zero inflation pressure, is provided having an integrated shelf design that enhances the handling characteristics of the support ring under run-flat conditions and may also lower the overall mass of the support ring in certain applications. In addition, the support ring has one or more features that improve the process of mounting the support ring onto a rim and better tolerate variations, within manufacturing tolerances, in the respective diameters of the rim and the support ring.

29 Claims, 14 Drawing Sheets

RUN-FLAT SUPPORT RING WITH INTEGRATED SHELF DESIGN AND IMPROVED MOUNTING FEATURES

TECHNICAL FIELD OF THE INVENTION

The present invention relates to an improved design for a run-flat support ring, which is a component mounted upon a rim inside a tire to extend the distance the tire may travel at reduced or zero inflation pressure. More particularly, the present invention relates to a run-flat support ring with an integrated shelf design that enhances the handling characteristics of the support ring under run-flat conditions. In addition, the present invention provides a support ring with features that improve the process of mounting the support ring onto a rim and features that better tolerate variations, within manufacturing tolerances, in the relative diameters of the rim and the support ring.

BACKGROUND OF THE INVENTION

Solutions have been proposed for assemblies that allow extended operation of a vehicle after a partial or total loss of air pressure. Many of these systems include multiple components that are complicated and time consuming to use or assemble. U.S. Pat. No. 5,891,279, which is incorporated herein in its entirety by reference, overcomes some of these difficulties. Such patent describes an assembly that includes a tire, a rim with a unique profile designed to accept the tire, and a deformable, but preferably circumferentially inextensible, run-flat support ring that is mounted over an essentially cylindrical bearing surface of the rim. The base of the support ring includes essentially inextensible, circumferentially oriented reinforcement elements to create an interference fit between the support and bearing surface of the rim. U.S. Patent Application Publication US2003/0005991, which is also incorporated herein in its entirety by reference, also describes a rim and run-flat support ring that includes a plurality of zones having protuberances on the bearing surface of the support but without a complementary depression in the rim.

The design of a run-flat support ring includes competing considerations of performance under run-flat conditions and assembly of the run-flat system. A certain amount of axial locating force is required when a run-flat support is mounted upon the rim. Preferably, this force is sufficiently low to allow proper seating of the support during mounting or dismounting. However, for run-flat operation, the force for unseating the ring from the rim must be sufficiently high so that the support maintains its proper position during reasonable vehicle operation. A run-flat support that optimizes these competing considerations while also providing improved handling characteristics during run-flat operation is preferred.

Furthermore, even when manufactured within reasonable and acceptable tolerances, a run-flat support having a diameter that is within the low end of its manufacturing tolerance may be particularly difficult to mount and dismount with a rim having a diameter that is within the upper end of its manufacturing tolerance. A run-flat support that more readily tolerates variances of the support and rim within the allowed manufacturing tolerances is also preferred.

SUMMARY OF THE INVENTION

Objects and advantages of the invention will be set forth in part in the following description, or may be obvious from the description, or may be learned through practice of the invention.

The present invention provides a run-flat support ring having features that improve the mounting and dismounting requirements for the support ring while still providing a fit that maintains the lateral and circumferential position of the support ring during proper operation of the vehicle under conditions of partial or total loss of inflation pressure. In addition, the present invention also provides a run-flat support ring that uses an integrated shelf design that provides improved handling characteristics for certain run-flat tire assemblies.

In one exemplary embodiment, the present invention provides a run-flat support ring for mounting inside a tire on a wheel rim. The tire has a tread strip region. The wheel rim has at least one annular depression and one annular raised surface. The support ring defines an axial direction based on the axis about which rotation occurs during operation. The support ring of the embodiment also defines an inboard side and an outboard side. The support ring includes a substantially cylindrical base that has a radially inner-most surface. This inner-most surface includes i) a plurality of circumferentially placed protuberances configured to engage the annular depression along the wheel rim; ii) a plurality of circumferentially placed tabs configured for engaging the wheel rim proximate to the annular depression; and iii) a plurality of circumferentially placed ribs, extending longitudinally along the axial direction, and configured for engaging the annular raised surface. The support ring also includes a substantially cylindrical cap that is configured for contact with the tread strip region in the event of a sufficient loss of air pressure. A substantially cylindrical body connects the base and the cap. The cap has an axial width that is greater than the axial of the body such that the cap extends in the axial direction along the outboard side of the support ring. This extension forms a shelf-like feature on the support ring.

For this exemplary embodiment, various elements may be modified or added depending upon the application. For example, a plurality of brackets may be provided that extend between the cap and the outboard side of the body. These brackets can provide additional support as will be discussed. The support ring may also be constructed so that the base has an axial width that is less than the axial width of the cap. Similarly, the base may be constructed so that it has an axial width that is greater than the axial width of the body. The body may be constructed from a plurality of wall members having a plurality of outboard surfaces, with the wall members being connected to the brackets along the outboard surfaces, and the outboard surfaces having a width along the circumferential direction that is about equal to the width of the brackets along the same direction.

As needed, various modifications can also be constructed upon the radially inner-most surface. For example, the tabs may be positioned at least partially between the protuberances or may be positioned in other locations upon the inner-most surface of the support ring. While the tabs are generally rectangular in shape, other shapes may be used as well. Preferably, the ribs are located axially adjacent to, and inboard of, the tabs but other variations are with the spirit and scope of the present invention. Also, although other dimensions may be used, it is preferred that the protuberances be about 1.7 mm or less in height relative to the radial inner-most surface. Certain embodiments may include about 8 to 12 ribs, spaced circumferentially about the radially inner-most surface. However, other embodiments may include, for each of the plurality of tabs, a rib that is axially adjacent to each tab.

In another embodiment of the present invention, a run-flat support ring for mounting on a wheel rim inside a tire is provided. The support ring is configured for contact with the tread strip region of the tire in the event of a sufficient loss of inflation pressure. The wheel rim defines an axis about which rotation occurs during operation. The wheel rim also defines an axial direction and a circumferential direction. The wheel rim has an annular recess and a seat for the support ring that includes an outboard bearing surface and an inboard bearing surface, wherein the inboard bearing surface is located at a greater radial distance from the axis than the outboard bearing surface. The support ring includes a base configured for placement around the wheel rim. The base defines a clip that is longitudinally oriented along the circumferential direction and is configured for positioning into the annular recess of the wheel rim. The clip has at least one discontinuity along the circumferential direction. A cap is provided that is configured for contact with the tread strip region in the event of a sufficient loss of air pressure. The support ring of this embodiment also includes a plurality of wall members extending in a radial direction between the base and the cap. Each wall member has an axial width that is less than the axial width of the cap such that the cap provides a shelf portion extending away from the wall members. Variations can be made to this embodiment of the present invention in manner similar to those discussed previously.

In still another exemplary embodiment, the present invention provides a run-flat support ring for mounting on a wheel rim within a tire where the wheel rim has a groove located circumferentially about the outer surface of the wheel rim. The support ring includes a substantially inextensible, circular body, configured for mounting upon the wheel rim. This body includes a radially inner-most component that defines multiple raised segments, configured for placement within the groove of the wheel rim. The raised segments each have a longitudinal axis that is oriented circumferentially along the radially innermost component and are separated from one another by a predetermined distance. The body also includes a radially outer-most component configured for contact with the tire during run-flat operation, and the body includes a plurality of wall members between the radially inner-most component and the radially outermost component. The radially outermost component has an axial width that is less than the axial width of the wall members. For additional support, a plurality of braces extend between an outboard side of the wall members and the radially outermost component. Again, variations can be made to this embodiment of the present invention in manner similar to those discussed previously.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in this specification, which makes reference to the appended figures, in which:

FIG. 2A illustrates a radially-inner surface of this embodiment as viewed from the outboard side.

FIG. 5A illustrates a radially-inner surface of this embodiment as viewed from the outboard side.

Figure 1:
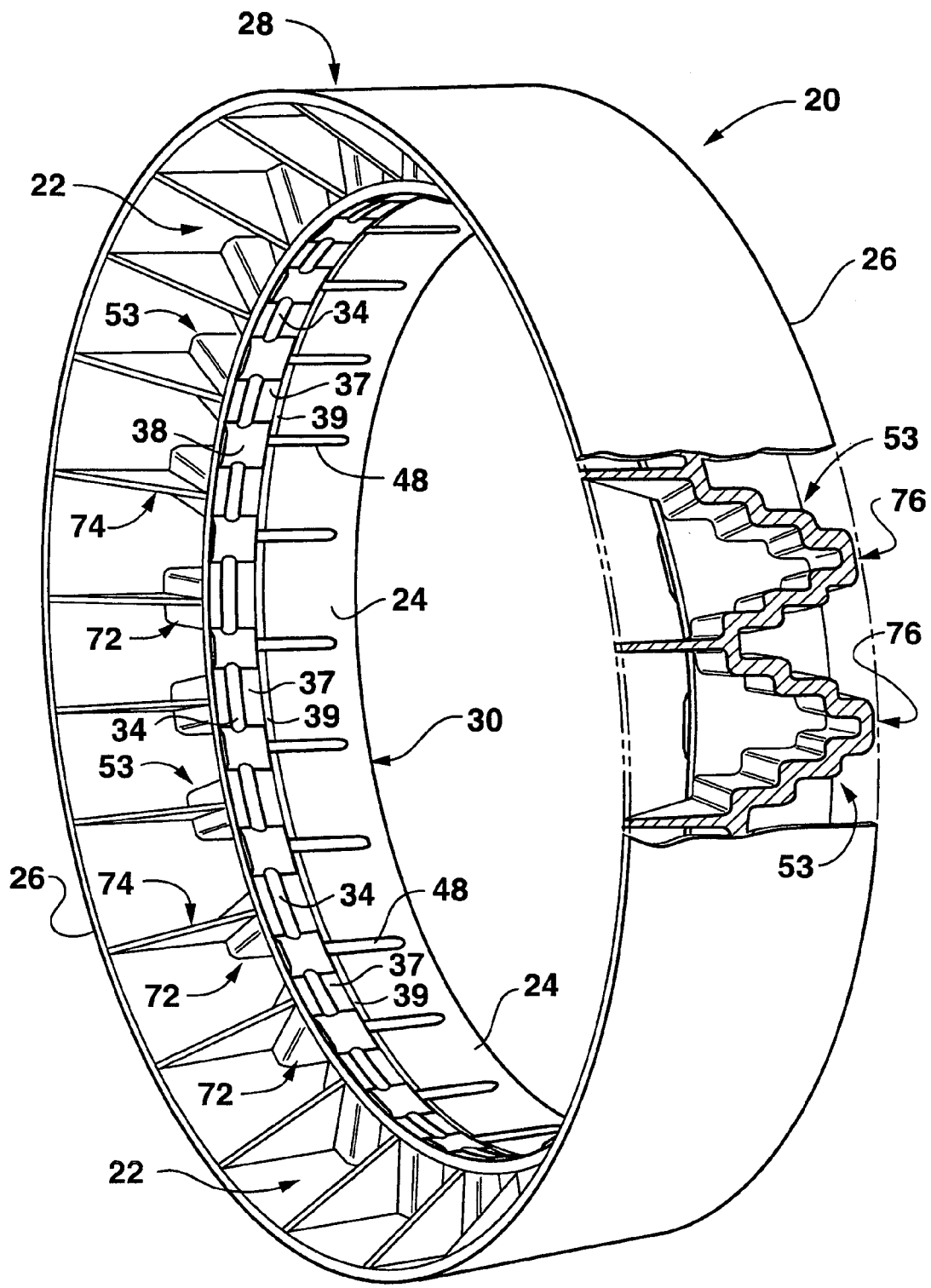
FIG. 1 is a perspective view of an exemplary embodiment of the present invention viewed from the outboard side.

Repeat use of reference characters in the present specification and drawings is intended to represent same or analogous features or elements of the invention.

DETAILED DESCRIPTION OF THE PREFERRED EMBODIMENTS

The present invention provides a support ring having improved mounting and dismounting characteristics. The support ring of the present invention is for use inside a tire as part of a run-flat system for operation at reduced or zero inflation pressure. As will be described, the support ring of the present invention is also provided with an integrated shelf design that improves performance under run-flat conditions. Reference will now be made in detail to embodiments of the present invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Figure 2A:
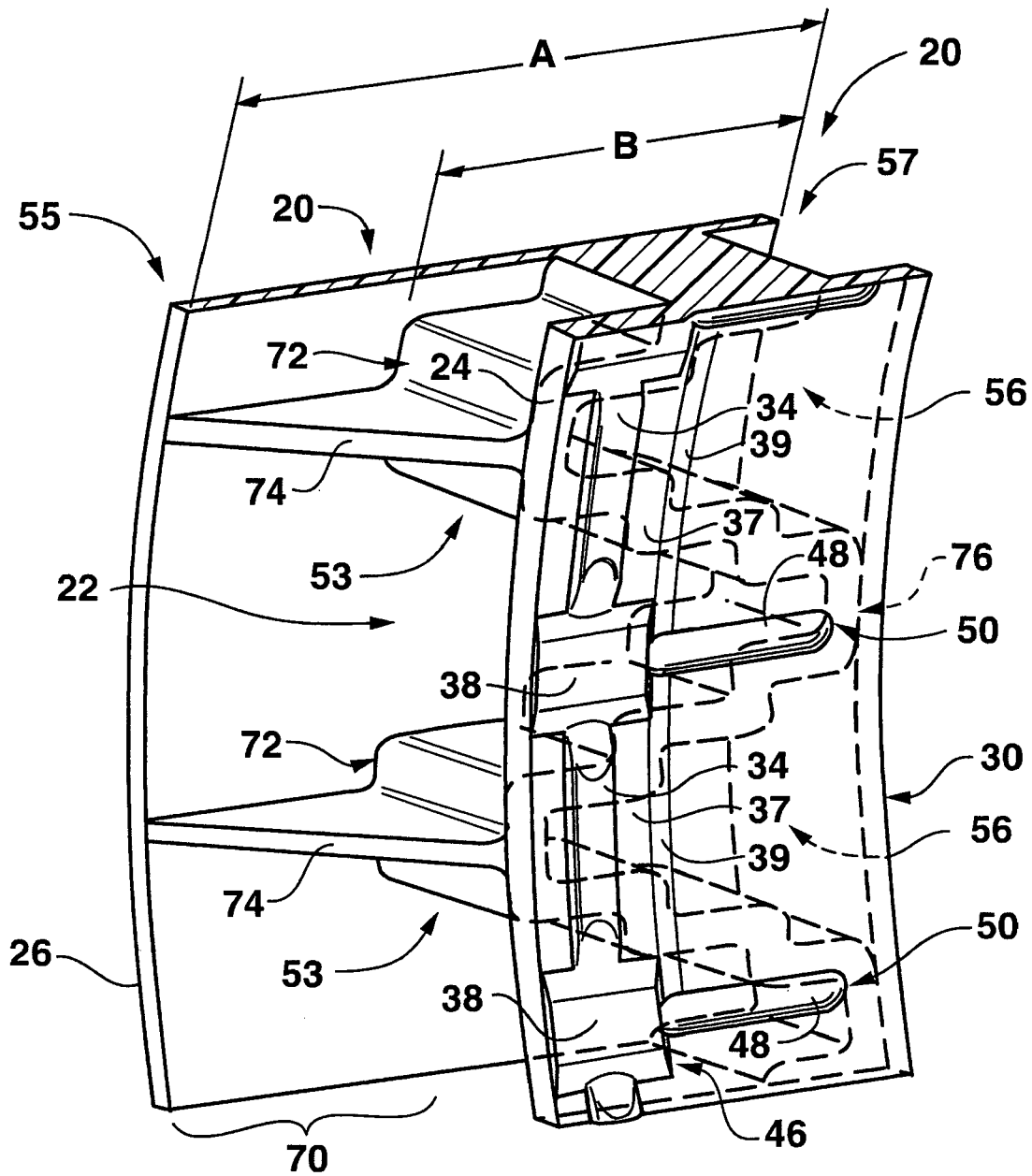
FIG. 2A is a perspective and close-up view of a section of the exemplary embodiment illustrated in FIG. 1.
Figure 3:
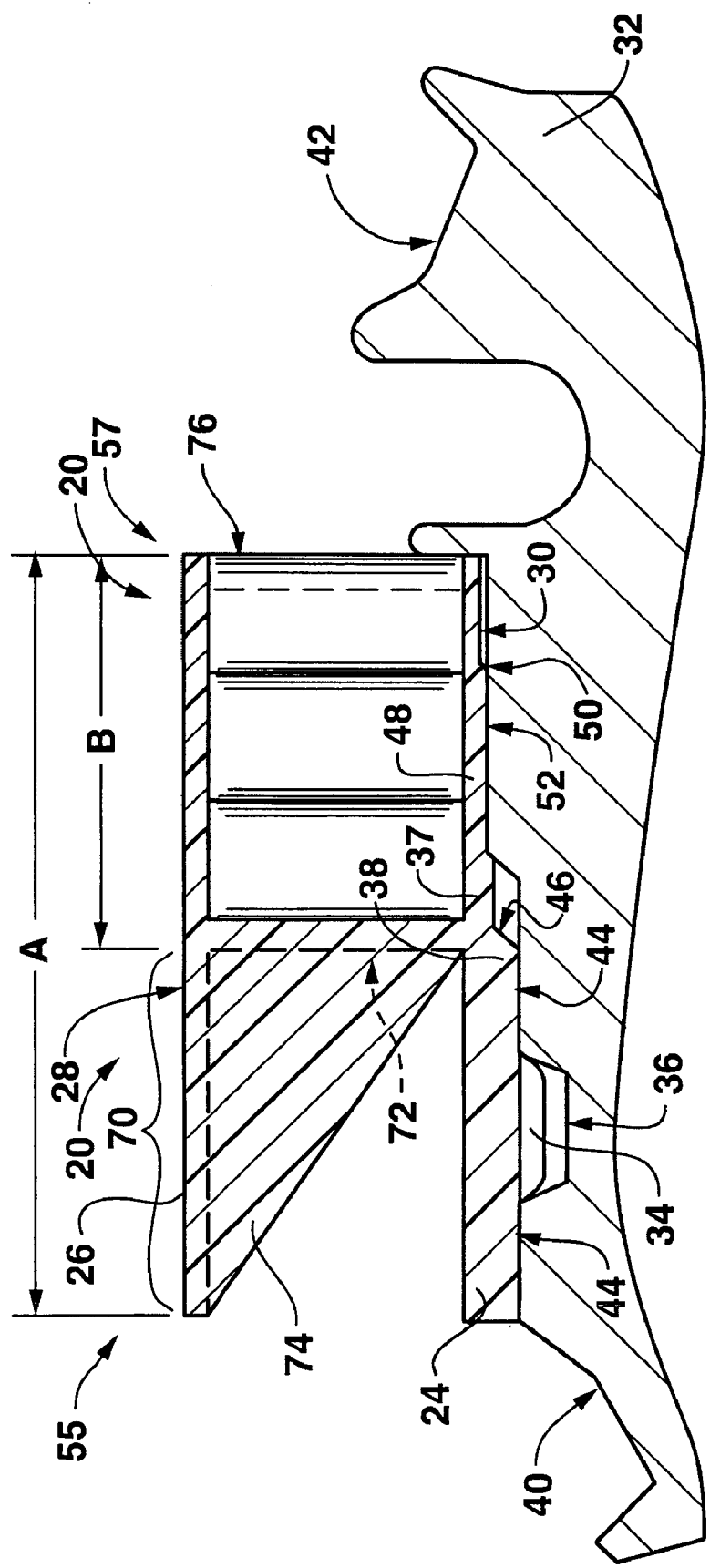
FIG. 3 is a cross-sectional view of the exemplary embodiment of the present invention illustrated in FIG. 1 and FIG. 2A as mounted upon a representative rim.

An exemplary embodiment of the present invention is depicted in FIG. 1, FIG. 2A, and FIG. 3. A run-flat support ring 20, also referred to as a support ring, is provided with a substantially cylindrical body 22 that connects a substantially cylindrical base 24 to a substantially cylindrical cap 26. Support ring 20 is placed over a rim 32 (FIG. 3) as part of a run-flat tire system. One of ordinary skill in the art will understand the process by which a support ring 20 is placed within a tire and mounted upon a rim 32 by rotating the assembly and applying certain lateral forces until properly seating support ring 20. During zero or low-pressure operation of the properly mounted support ring 20, radially outermost surface 28 of support ring 20 contacts the inner surface of the tire, referred to herein as the tread strip region, to provide improved handling characteristics during reasonable vehicle operation.

Radially inner-most surface 30 is supported upon rim 32 of the run-flat tire system. As shown in FIG. 3, when properly positioned upon rim 32, support ring 20 rests upon a support ring seat that includes outboard bearing surface 44 and inboard bearing surface 52. A plurality of protuberances 34, also referred to as clips, are defined by surface 30 of support ring 20 and positioned along the circumferential direction of run-flat support ring 20. Each protuberance 34 is positioned within an annular recess 36 defined by rim 32. For the exemplary embodiment of FIGS. 1 through 3, each protuberance 34 may have a height of about 1.7 mm or less relative to radially inner-most surface 30. As support ring 20 is substantially inextensible, protuberances 34 resist dismounting or movement of support ring 20 in the axial direction during reasonable vehicle operation.

Figure 6:
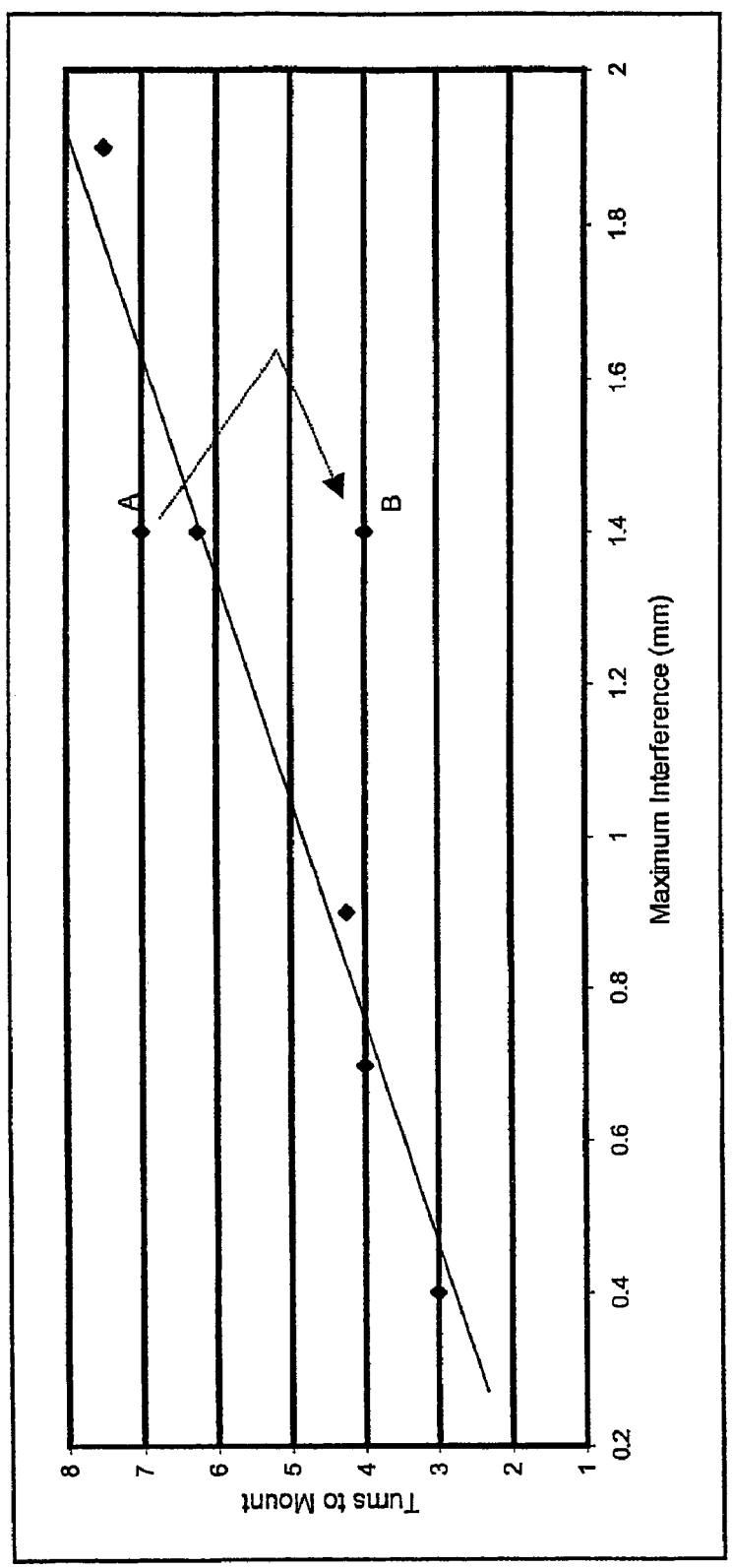
FIG. 6 is a plot of certain data as described more fully below.

Rather than a plurality of spaced or segmented protuberances 34 as shown in FIGS. 1 and 2, previous support rings have included a continuous clip or protuberance oriented circumferentially along the radially innermost surface 30 and typically configured for positioning within a recess on the rim. One part of applicant's invention is the discovery that segmenting this continuous clip into a plurality of spaced protuberances 34, as shown for example in FIGS. 1 and 2A, provides improved mounting and dismounting characteristics for support ring 20. FIG. 6 illustrates the effect of segmentation of the continuous clip into a plurality of clips or protuberances. One of ordinary skill in the art will understand the process by which a support ring is mounted upon a rim by rotating the rim while a lateral force is applied to seat the ring onto the rim. In FIG. 6, the x-axis represents the amount of interference between the protuberances or clips on a support ring and the mounted rim. The y-axis represents the number of times the rim had to be turned during the mounting process in order to properly seat the support ring onto the rim.

One design objective for a support ring is to minimize the number of turns required to mount the support ring onto the rim. As represented by a line drawn through the data in FIG. 6, as the amount of interference increases the number of turns required to mount the support ring also increases. Applicant determined that for a given interference, the number of turns required to mount the support ring decreased significantly by segmenting the continuous clip into a plurality of protuberances or clips. For example, for an interference of 1.4 mm, removing 100 mm from an otherwise continuous clip to create a plurality of protuberances or clips about the circumference of the support ring had the effect of decreasing the number of turns required to mount the support ring from 7 turns (Point A) to 4 turns (Point B) as depicted in FIG. 6. The result represents a substantial improvement in the time and labor required for mounting the support ring. Additional testing also revealed that separating the continuous clip into a plurality of protuberances or clips could be accomplished without unacceptably compromising the ability of the support ring to resist dismounting from the rim when operating forces are applied—such as when the vehicles turns or impacts a curb during reasonable operation at low or zero inflation pressures. It should be understood that an improvement in mounting characteristics can be achieved by removing only a single section of about 10 mm in length from a clip that is otherwise continuous circumferentially about the inner surface of the support ring, and such is within the scope of the present invention. This single discontinuity provides for a thread-like effect as the support ring is turned relative to the rim during the mounting process. Preferably, however, multiple discontinuities (which creates a plurality of clips) are uniformly spaced about the inner surface of the support ring to further enhance this thread-like effect.

Returning to the discussion of the exemplary embodiment of FIGS. 1, 2A, and 3, a plurality of rotation resisting surfaces or tabs 38 are spaced about run-flat support ring 20. For this exemplary embodiment, each individual tab 38 is at least partially located between two protuberances 34. By way of example only, each tab 38 may have a height of about 1.5 mm or less relative to the surface of annular band 37.

During mounting, support ring 20 is moved onto rim 32 in the inboard direction, which in FIG. 3 is a direction from outboard rim seat 40 towards inboard rim seat 42. As this movement takes place, rim 32 contacts an annular band 37 defined by radially-innermost surface 30. Contact with band 37 occurs first along the sloped, inboard edge 39 (FIG. 1 and FIG. 2A) of surface 30. As shown in FIG. 2A, the slope of edge 39 is preferably at an angle of about 30 degrees and facilitates positioning of the support ring 20. Using the teachings disclosed herein, one of ordinary skill in the art will appreciate that other slope angles may be used. As lateral movement of the support ring 20 continues in the inboard direction, tab 38 makes contact with rim 32 along outboard bearing surface 44 of rim 32. The inboard edge 46 of each tab 38 is also sloped to provide a slight ramp. This feature also further facilitates the placement of support ring 20 onto rim 32 during the mounting process and provides a means of compensating for variations within manufacturing tolerances for support ring 20 and rim 32. As shown in FIG. 3, once support ring 20 is in the proper position, tabs 38 contact rim 32 along portions of outboard bearing surface 44 that are adjacent to annular recess 36. The interference between tab 38 and rim 32 helps secure the position of support ring 20 and provides resistance against the undesirable rotation of support ring 20 relative to rim 32 during reasonable vehicle operation.

Referring to FIG. 1 and FIG. 2, also positioned upon radially inner-most surface 30 are a plurality of ribs 48 that are each located axially adjacent to, and to the inboard side of, tabs 38. Each rib 48 is longitudinally oriented along the axial direction. For the exemplary embodiment being discussed, each rib 48 has a height of about 1.2 mm or less relative to radially inner-most surface 30 and also has a height slightly less than protuberance 34. As support ring 20 is moved onto rim 32 during the mounting process, inboard edge 50 of rib 48 makes contact with inboard bearing surface 52. To enhance the ease by which that support ring 20 is mounted onto rim 32, the inboard edge 50 of each rib 48 is curvilinear in shape as shown in FIG. 2A. This feature, like inboard edge 46, also helps to ensure the support ring 20 can be more readily mounted despite variations in the size of the support ring 20 and rim 32 within manufacturing tolerances. Once support ring 20 is in position as shown in FIG. 3, ribs 48 contribute to the interference fit between support ring 20 and rim 32 and thereby help secure the assembly. More specifically, inboard bearing surface 52 is at a greater radial distance from the axis of rotation of rim 32 than outboard bearing surface 44, and ribs 48 provide an interference fit through contact with inboard bearing surface 52.

Continuing with the description of the exemplary embodiment of FIGS. 1, 2A, and 3, the axial width B of cylindrical body 22 is less than the axial width A of cylindrical cap 26. More specifically, cylindrical cap 26 extends in the axial direction on the outboard side 55 of support ring 20 so as to form shelf portion 70 (FIG. 3). Cylindrical body 22 is constructed from a plurality of wall members 53. As shown, shelf portion 70 extends away from wall members 53 but does not extend over outboard rim seat 40. Additionally, each wall member 53 has an outboard surface 72, which is the outermost surface of wall member 53 on the outboard side 55 of support ring 20. A plurality of brackets 74 (also referred to herein as braces) extend between cylindrical cap 26 and outboard surface 72. For this particular embodiment, brackets 74, shelf portion 70, and wall members 53 are integrally formed as part of support ring 20.

During periods of run-flat operation, loading of support ring 20 is borne primarily by the plurality of wall members 53 that form cylindrical body 22. A series of ridges 59 on each wall member 53 improves the load bearing capability. One part of applicants' invention is the discovery that the axial width B of cylindrical body 22 can be reduced relative to the axial width A of cylindrical cap 26 so as to help reduce the overall weight of support ring 20. While the overall weight is reduced, shelf portion 70 provides enhanced handling capabilities for support ring 20 during periods of run-flat operation. By way of example only, shelf portion 70 operates against the lateral movement of a tire relative to support ring 20 and rim 32 during run-flat operation. Brackets 74 provide structural support to shelf portion 70. Again, by way of example only, brackets 74 operate primarily to prevent distortion of support ring 20 from centrifugal forces during tire rotation.

As shown in FIG. 1 and FIG. 2, cylindrical body 22 is created by the adjacent connection of each wall member 53 along the circumferential direction of support ring 20. It should be understood that the present invention does required such a continuous structure to form cylindrical body 22. By way of example only, in certain embodiments, wall members 53 might have a gap or discontinuity between each wall member at inboard surface 76 on the inboard side 57 of support ring 20. Additionally, although not required, preferably each protuberance 34 is located at a position radially adjacent to an outboard surface 72. The overall shape of body 22 can also be varied as can the relative width and length of protuberances 34, tabs 38, and ribs 48.

Run-flat support ring 20 can be constructed from a variety of different materials. In general, a material having a tensile modulus at 10 percent strain of 10 to 100 MPa should be used. By way of example, but not limitation, suitable materials include polyurethane, thermoplastic elastomers, and rubber. Additionally, while body 22, base 24, and cap 26 may be individually constructed and combined to create support ring 20, preferably these parts are molded as a single component to create support ring 20. It should also be noted that while the present description has been provided using the particular configuration for a rim 32 as shown in FIGS. 1 through 3, the present invention is not limited to any particular rim configuration as will be understood by one of skill in the art using the teachings disclosed herein.

Figure 2B:
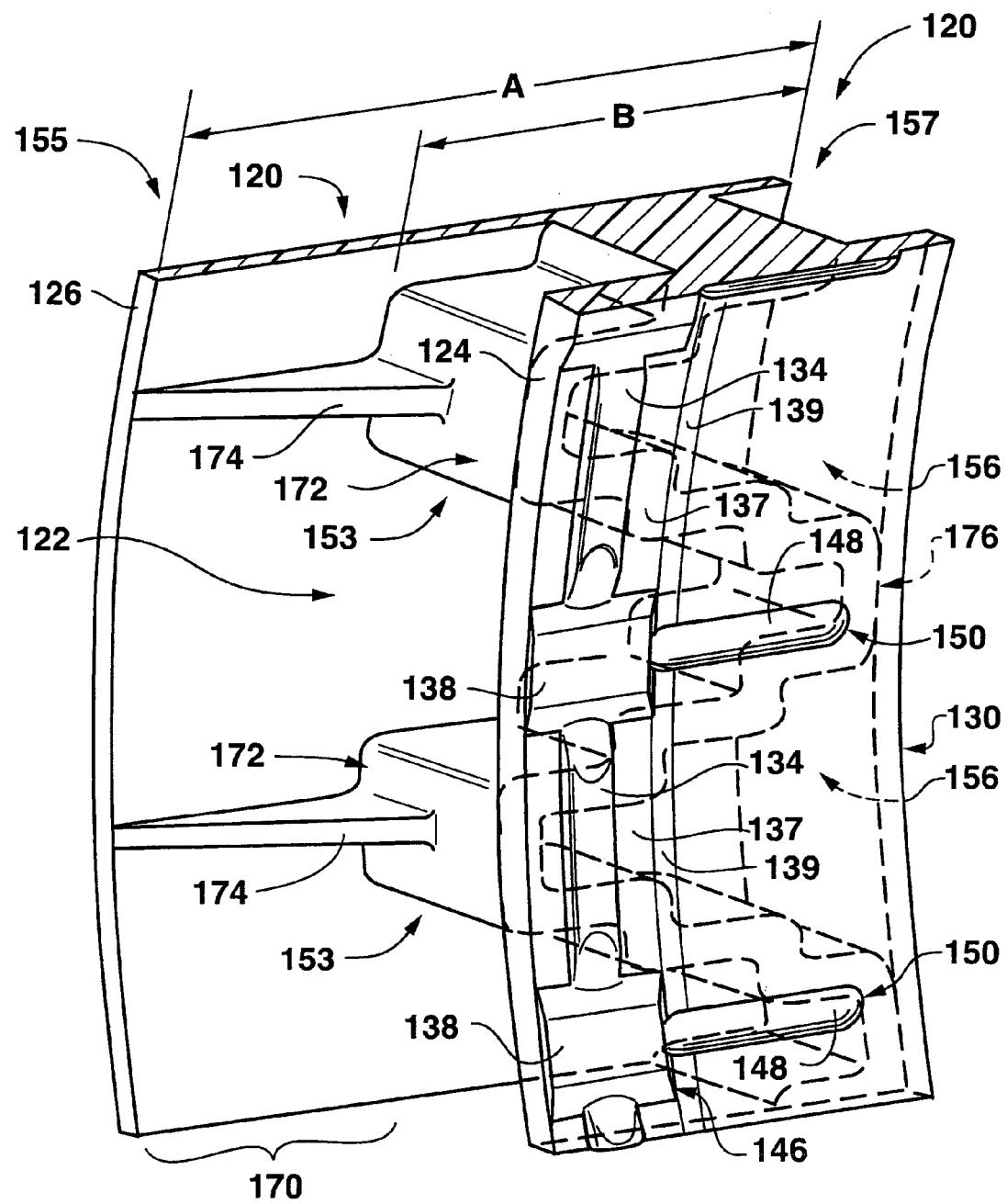
FIG. 2B is a perspective and close-up view of a section of an exemplary embodiment of the present invention, illustrating a radially-inner surface of this embodiment as viewed from the outboard side.

Additionally, using the teachings disclosed herein, one skilled in the art will appreciate numerous other variations and alternative embodiments that fall within the spirit of the invention and scope of the claims set forth below. By way of example only, an alternative embodiment of a support ring 120 of the present invention is depicted in FIG. 2B. This embodiment is similar to the embodiment of FIG. 2A, with the exception that each bracket 174 has a radial height (height measured in the radial direction) that is less than the height of the axially adjacent wall member 53 from which each bracket 174 extends. Although bracket 174 is illustrated in FIG. 2B as having a height approximately half that of wall member 53, it will be understood that the relative heights may be varied as needed and such is within the spirit and scope of the present invention.

Figure 2C:
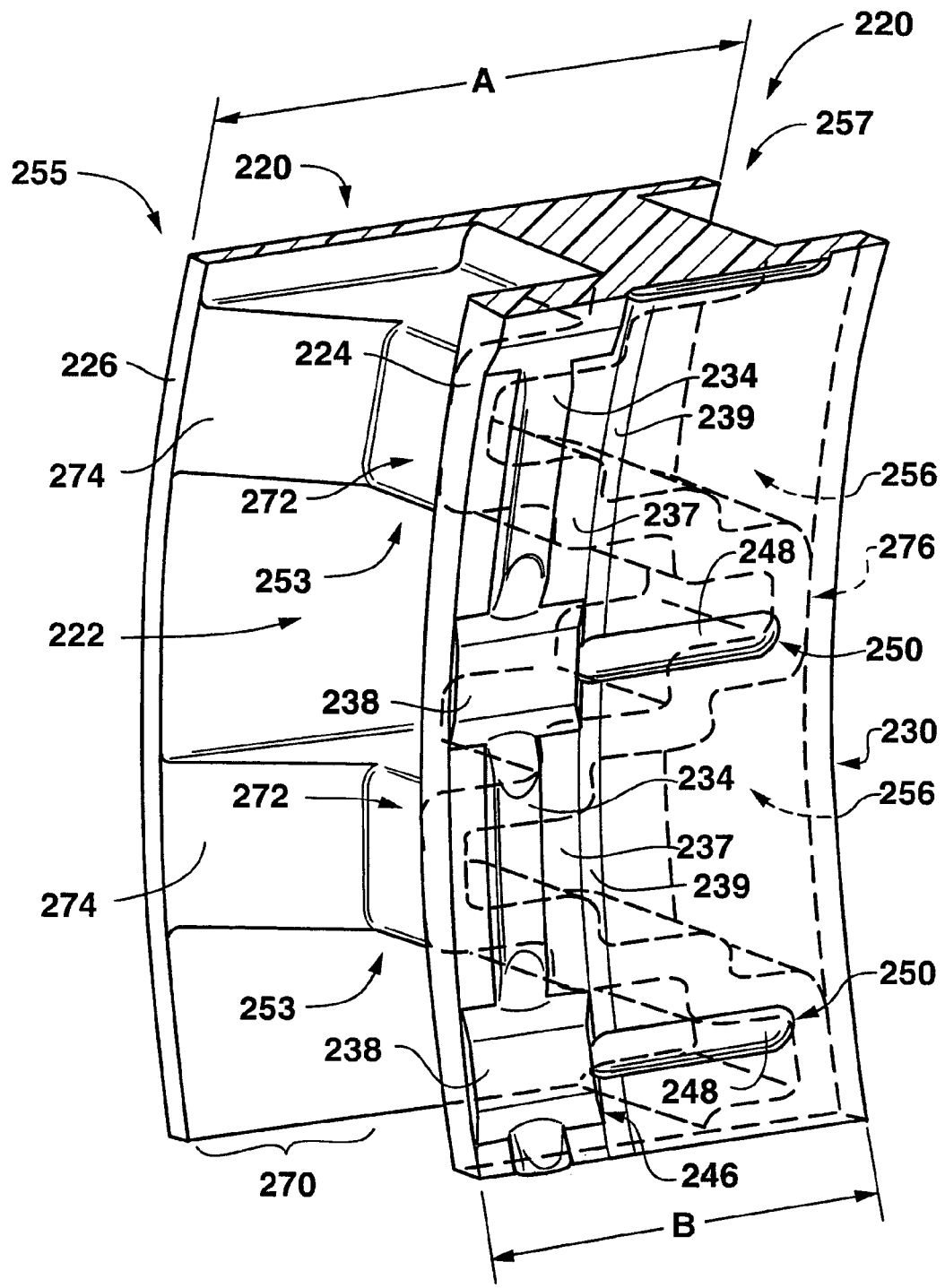
FIG. 2C is a perspective and close-up view of a section of an exemplary embodiment of the present invention, illustrating a radially inner-surface of this embodiment as viewed from the outboard side.

In addition to variations in the height of brackets 74 and 174, the circumferential width (width measured in the circumferential direction) of these elements may also be varied as needed. Referring now to FIG. 2C, support ring 220 has a plurality of brackets 274 attached to a plurality of wall members 253. In contrast to the relatively narrow width of brackets 74 and 174, each bracket 274 has the same width as an adjacent outboard surface 172. Increasing the width of brackets 274 in this manner may offer additional lateral support to shelf portion 270 in certain applications. It should be understood that the present invention does not require that the height and width of each bracket 74, 174, or 274 must be uniform for a given support ring. Instead, for example, an alternating pattern of changing widths and heights may also be used.

Figure 2D:
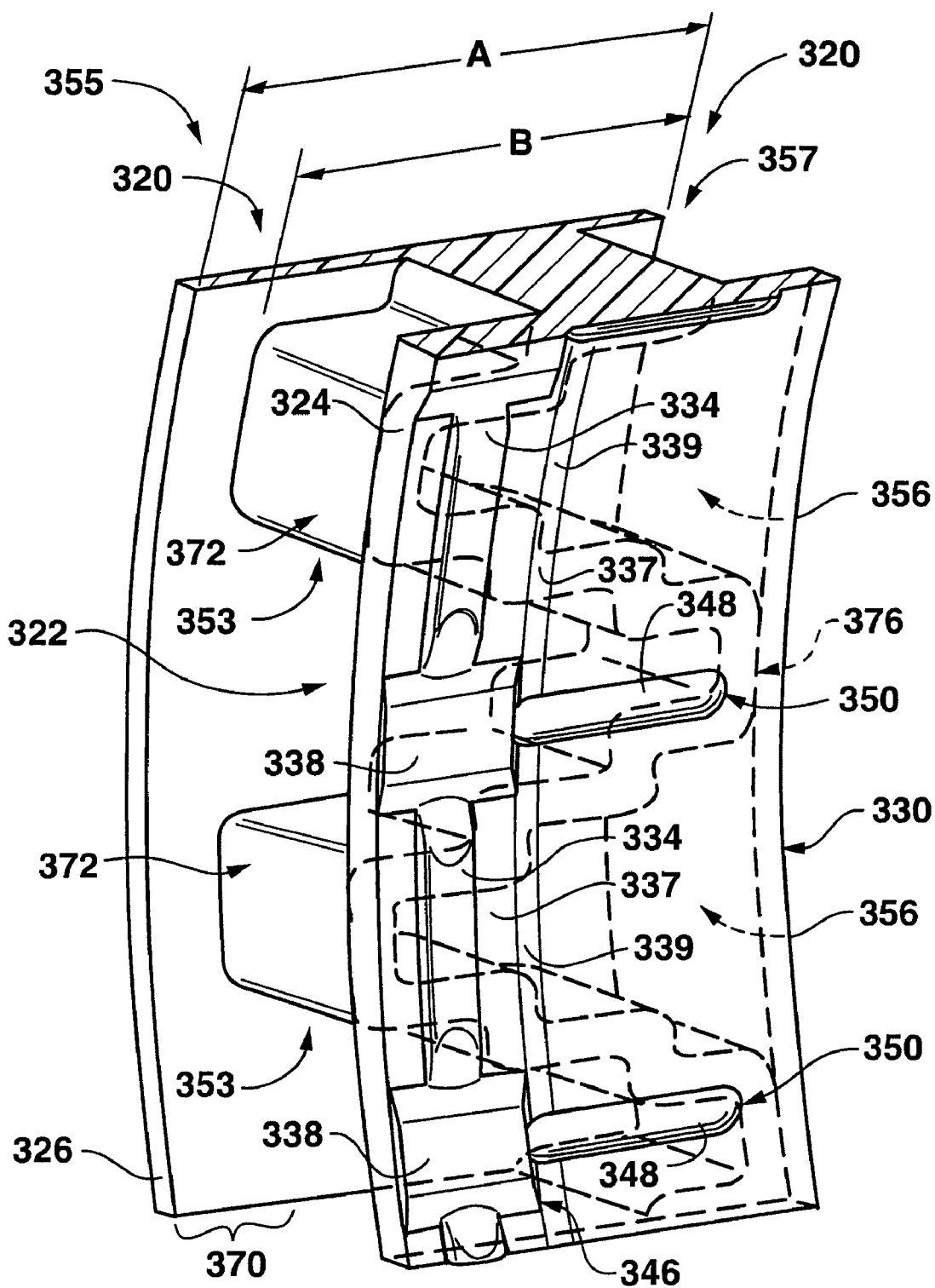
FIG. 2D is a perspective and close-up view of a section of an exemplary embodiment of the present invention, illustrating a radially inner-surface of this embodiment as viewed from the outboard side.
Figure 2E:
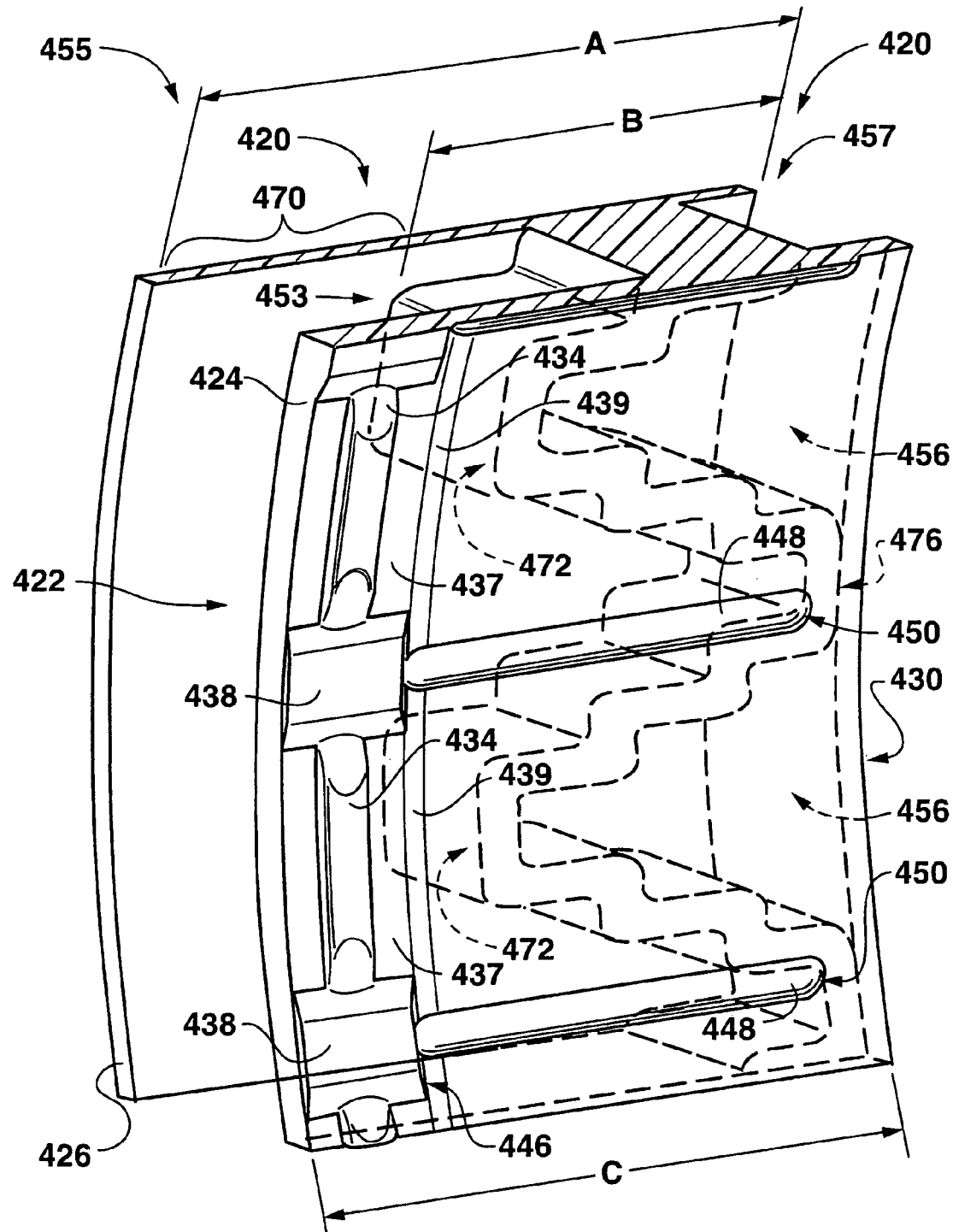
FIG. 2E is a perspective and close-up view of a section of an exemplary embodiment of the present invention, illustrating a radially inner-surface of this embodiment as viewed from the outboard side.

FIG. 2D provides another exemplary embodiment of a support ring 320 of the present invention in which brackets are not utilized. For this embodiment, the axial width A of cylindrical cap 326 is still greater than the axial width B of cylindrical body 322 so that an integrated shelf portion 370 is created. However, the overall difference between axial widths A and B has been decreased to provide additional support bearing capability in support ring 320. Because the overall axial width of shelf portion 370 is relatively less as compared to the shelf portions 70, 170, and 270 of the previously described embodiments, for certain vehicle applications support ring 320 does not require brackets for additional support. Similarly, referring to FIG. 2E, support ring 420 is another exemplary embodiment of the present invention also not utilizing brackets as previously discussed. The axial width A of cylindrical cap 326 is about equal to the axial width C of cylindrical base 424. An integrated shelf portion 470 is created by the extension in the outboard direction of cylindrical cap 326 to a greater axial width A than the axial width B of cylindrical body 422. Thus, in certain applications, brackets may be eliminated to further decrease the weight as described here with support ring 320 and support ring 420. However, using the teachings disclosed herein, one of ordinary skill in the art will understand that brackets could be added to either of these embodiments if necessary and such modification falls with the spirit of the invention and the scope of the claims that follow.

Figure 4:
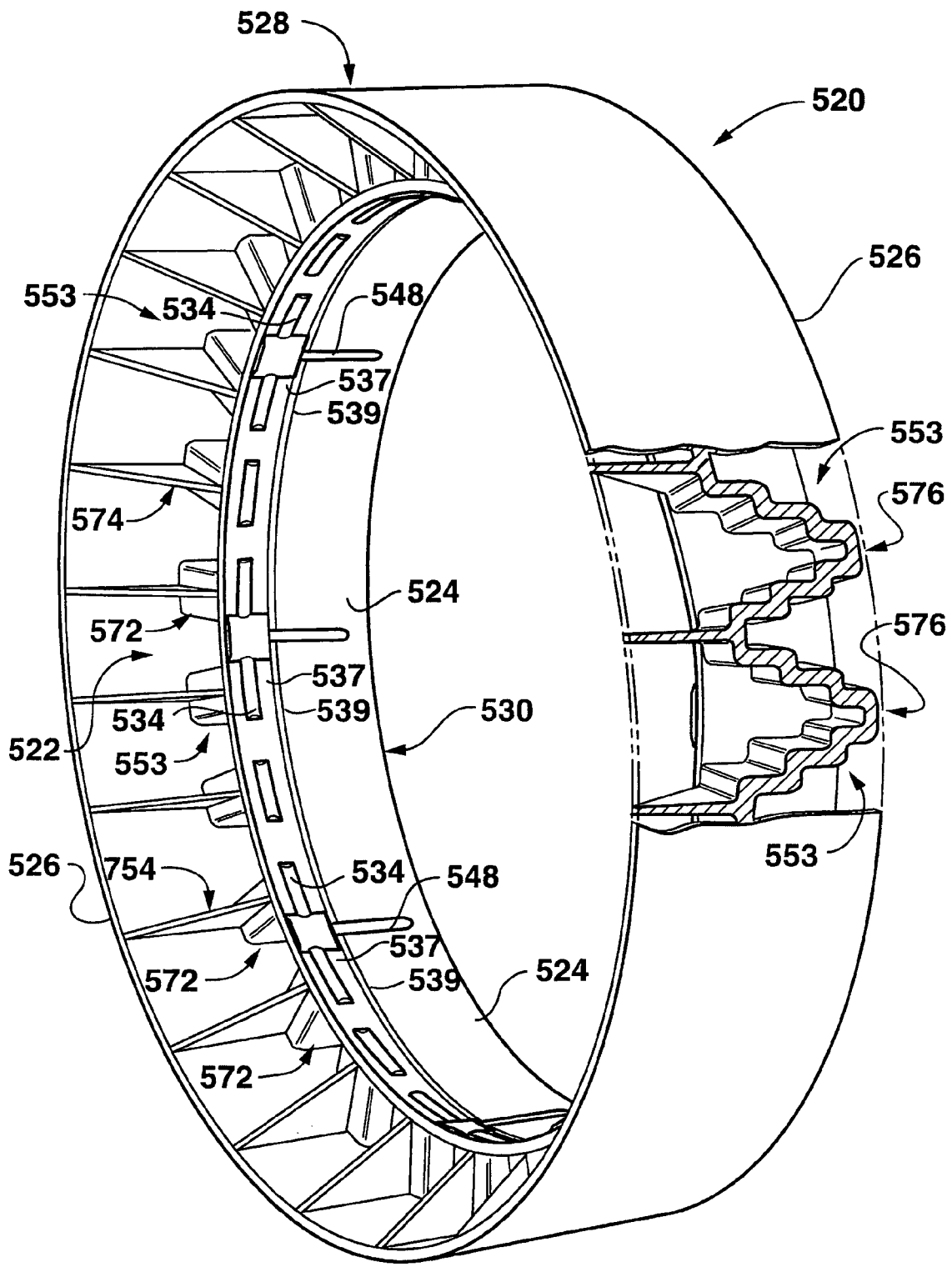
FIG. 4 is a perspective view of an exemplary embodiment of the present invention viewed from the outboard side.
Figure 5A:
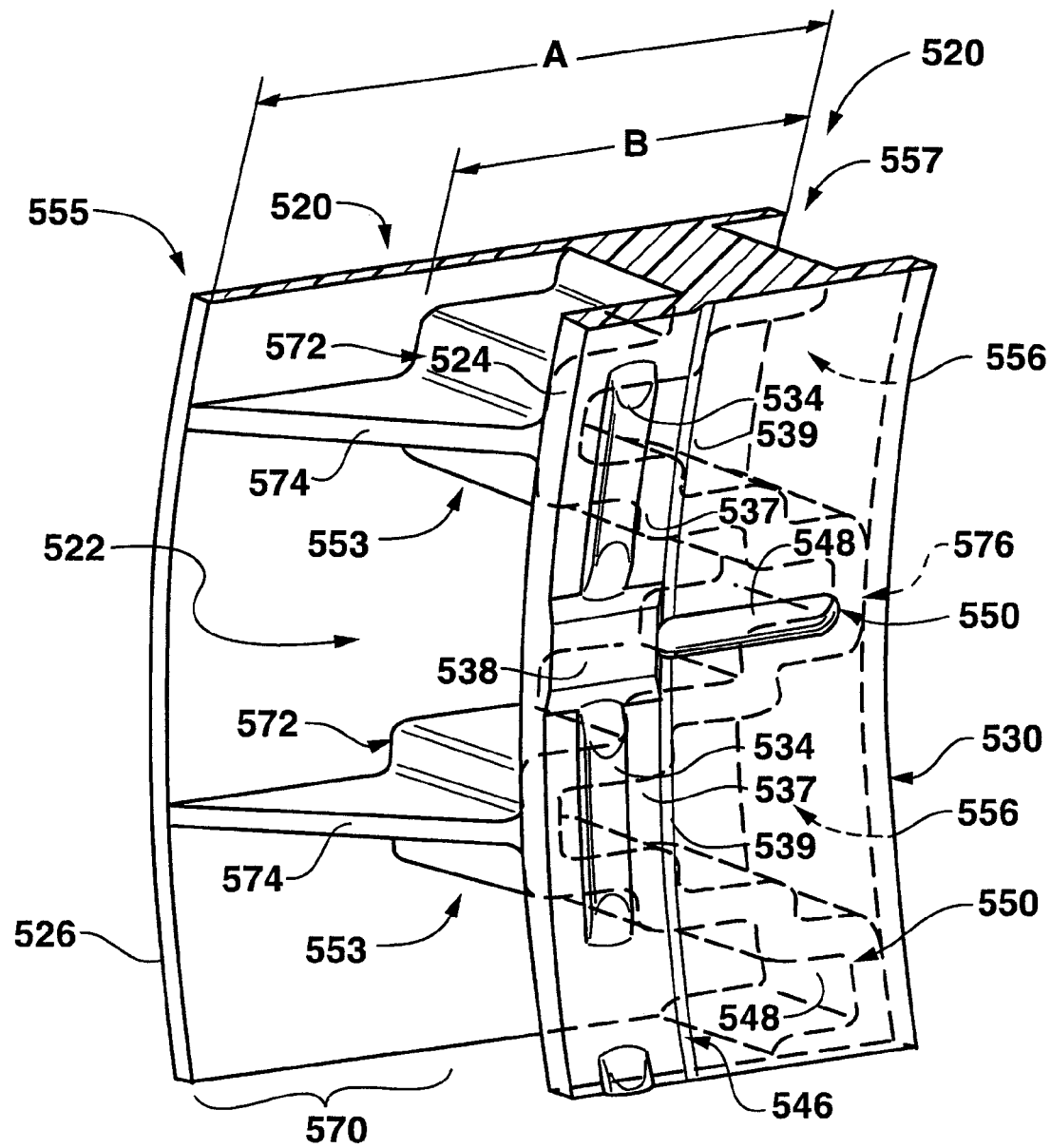
FIG. 5A is a perspective and close-up view of a section of the exemplary embodiment illustrated in FIG. 4.

FIG. 4 and FIG. 5A illustrate another exemplary embodiment of a support ring 520 of the present invention Support ring 520 has a cylindrical body 522, a cylindrical base 524, and a cylindrical cap 526 in a manner similar to previously discussed embodiments. Additionally, support ring 520 also has a plurality of clips or protuberances 534 that are spaced circumferentially along radially inner-most surface 530. Protuberances 534 also fit into a recess on a rim of a run-flat support system to provide resistance against axial displacement of support ring 520 from a rim. Support ring 520 also includes a shelf portion 570 supported by brackets 574 in a manner that is similar to the embodiment illustrated in FIG. 1, FIG. 2A, and FIG. 3. However, unlike previously discussed exemplary embodiments, support ring 520 does not include a tab between each of the protuberances 534.

Instead, eight tabs 538 are equally spaced about radially inner-most surface 530 of support ring 520. Each tab 538 includes a sloped inboard edge 546 to facilitate the mounting of support ring 520 upon a tire rim as previously described. Additionally, a plurality of ribs 548 are also provided at positions axially adjacent to teach tab 538 and are longitudinally oriented along the axial direction of support ring 520. Each rib 548 has an inboard edge 550 that is curvilinear in shape to further enhance the mounting of support ring 520 onto a rim as also previously described. Multiple variations of the present invention are possible wherein different numbers of tabs 538 and ribs 548 are positioned at different locations about radially inner-most surface 530. Applicant has determined that between about eight to twelve tabs are preferred for certain applications. However, the present invention is not so limited. In addition, the present invention does not require that tabs 538 be equally spaced about the radially inner-most surface 530; other variations may be used as will be understood using the teachings disclosed herein.

Figure 5B:
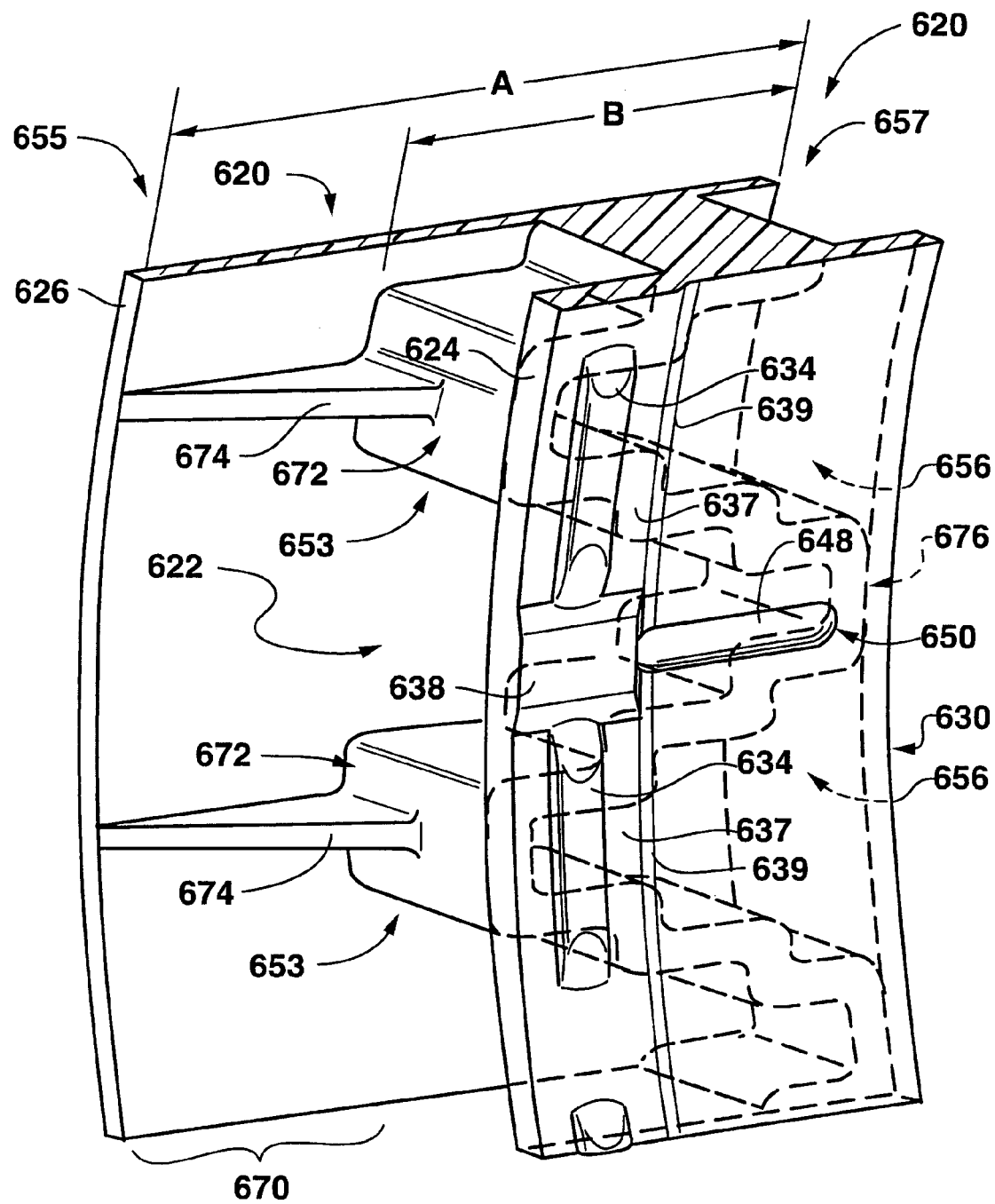
FIG. 5B is a perspective and close-up view of a section of an exemplary embodiment of the present invention, illustrating a radially-inner surface of this embodiment as viewed from the outboard side.

Support ring 120 of FIG. 2B can also be modified so that a tab in not used between each of the clips or protuberances 534. Such a modification is illustrated as support ring 620 in FIG. 5B. Support ring 620 includes a plurality of protuberances 634 but does not include a tab 638 between each pair of protuberances 634. As with the embodiment of FIG. 2B, brackets 674 in FIG. 5B have a radial height that is less than the radial height of wall member 653.

Figure 5C:
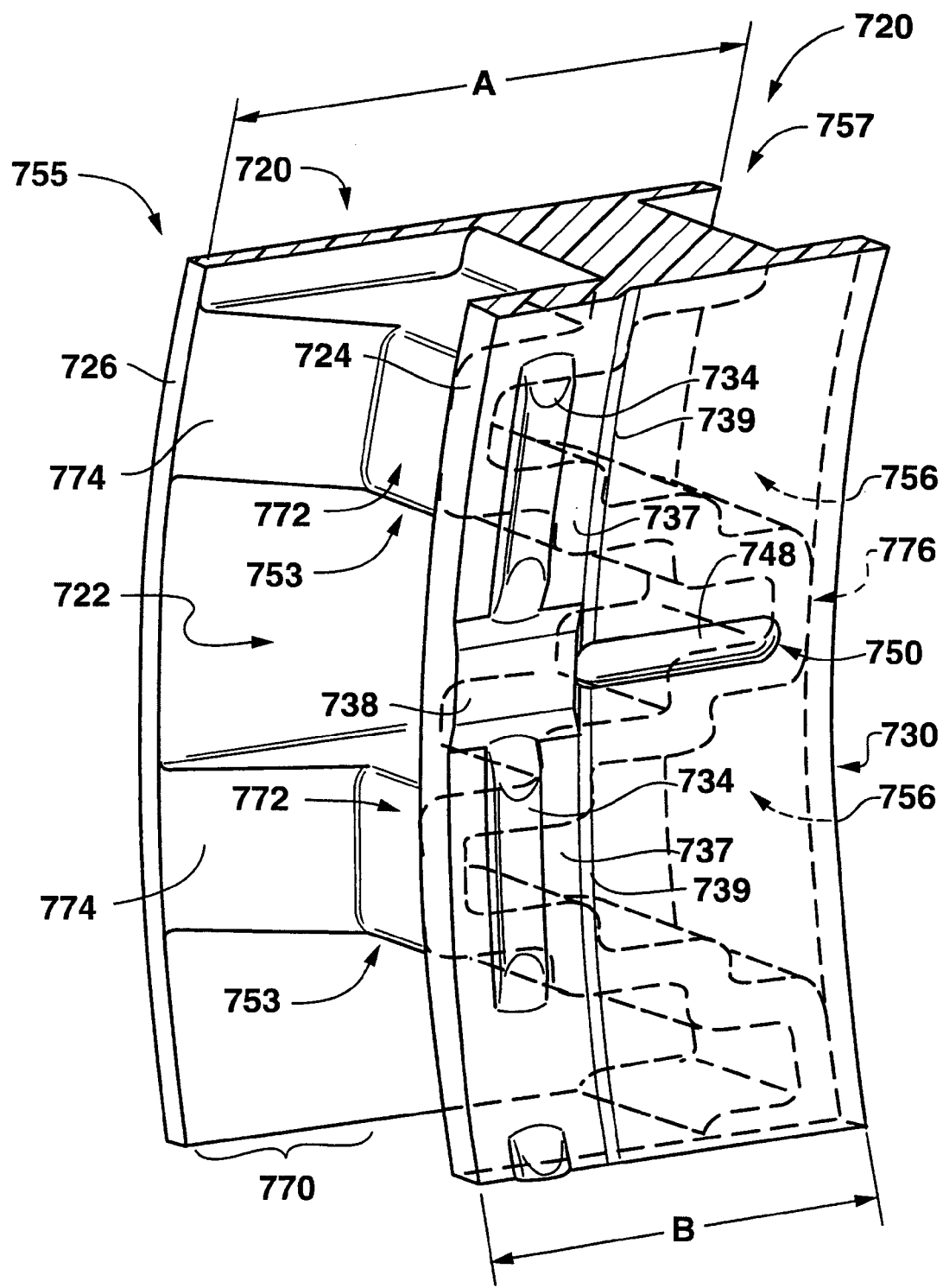
FIG. 5C is a perspective and close-up view of a section of an exemplary embodiment of the present invention, illustrating a radially inner-surface of this embodiment as viewed from the outboard side.

Similary, FIG. 5C illustrates an embodiment of the present invention, support ring 720 that is similar to the embodiment of FIG. 2C, support ring 220. However, support ring 720 also does not include a tab 738 between each pair of protuberances 734. In a manner similar to the embodiment illustrated in FIG. 2C, support ring 720 has a plurality of brackets 774 attached to a plurality of wall members 753. Each bracket 774 has the same width as an adjacent outboard surface 772.

Figure 5D:
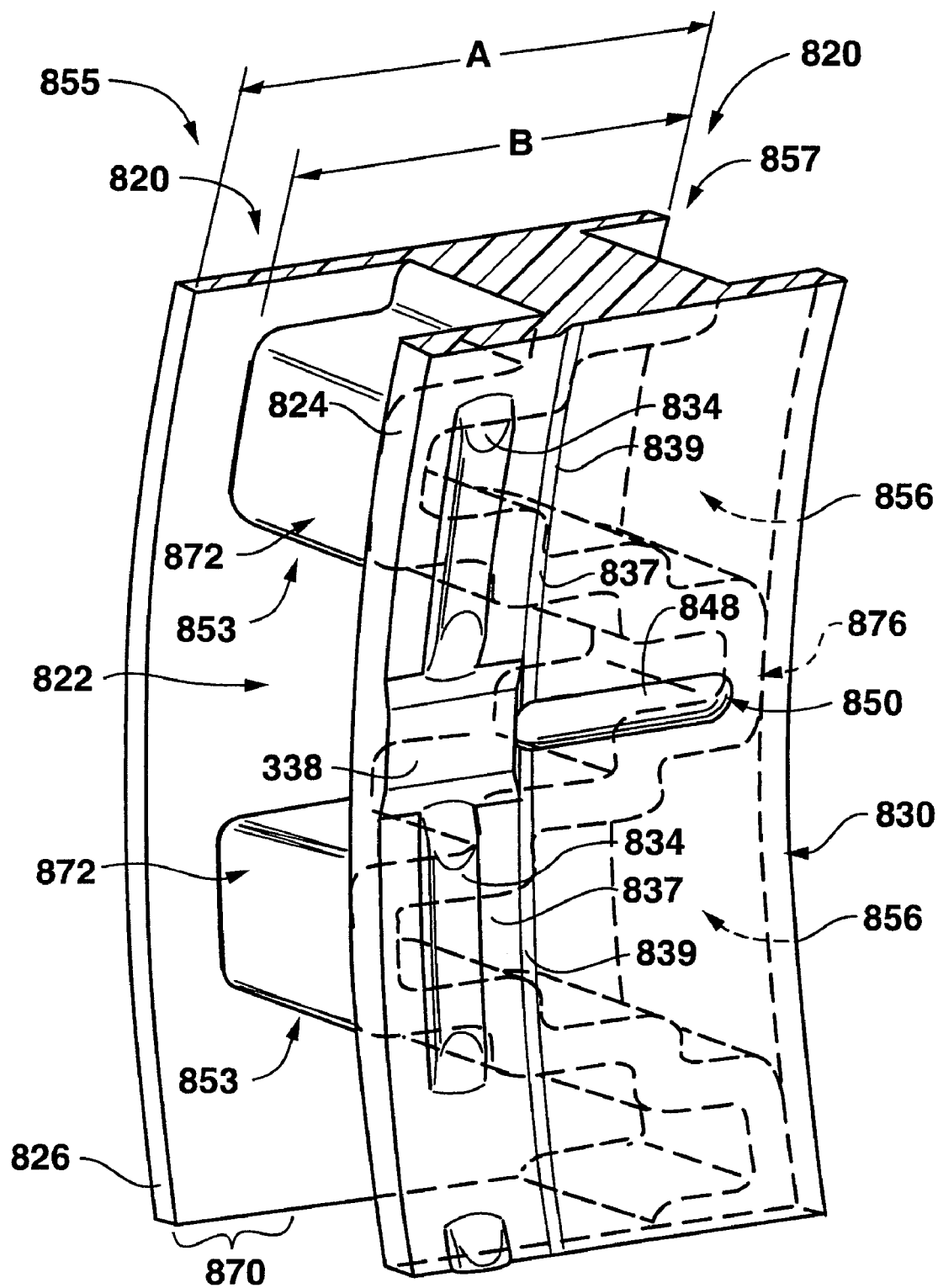
FIG. 5D is a perspective and close-up view of a section of an exemplary embodiment of the present invention, illustrating a radially inner-surface of this embodiment as viewed from the outboard side.

FIG. 5D illustrates another embodiment of the present invention, support ring 820, that can be obtained by modifying the support ring 320 of FIG. 2D such that a tab is not located between each pair of protuberances. As shown in FIG. 5D, support ring 820 includes a plurality of protuberances 834 and a plurality of tabs 838. However, a tab 838 is not located between each pair of protuberances 834. Preferably, about 8 to 12 tabs are equally spaced about the circumference of support ring 820. However, other variations are possible as already discussed. In a manner similar to the embodiment of FIG. 2D, for support ring 820 the axial width A of cylindrical cap 826 is still larger than the axial width B of cylindrical body 822 so that an integrated shelf portion 870 is created. However, the overall difference between axial widths A and B has been decreased to provide additional support bearing capability in support ring 820.

Figure 5E:
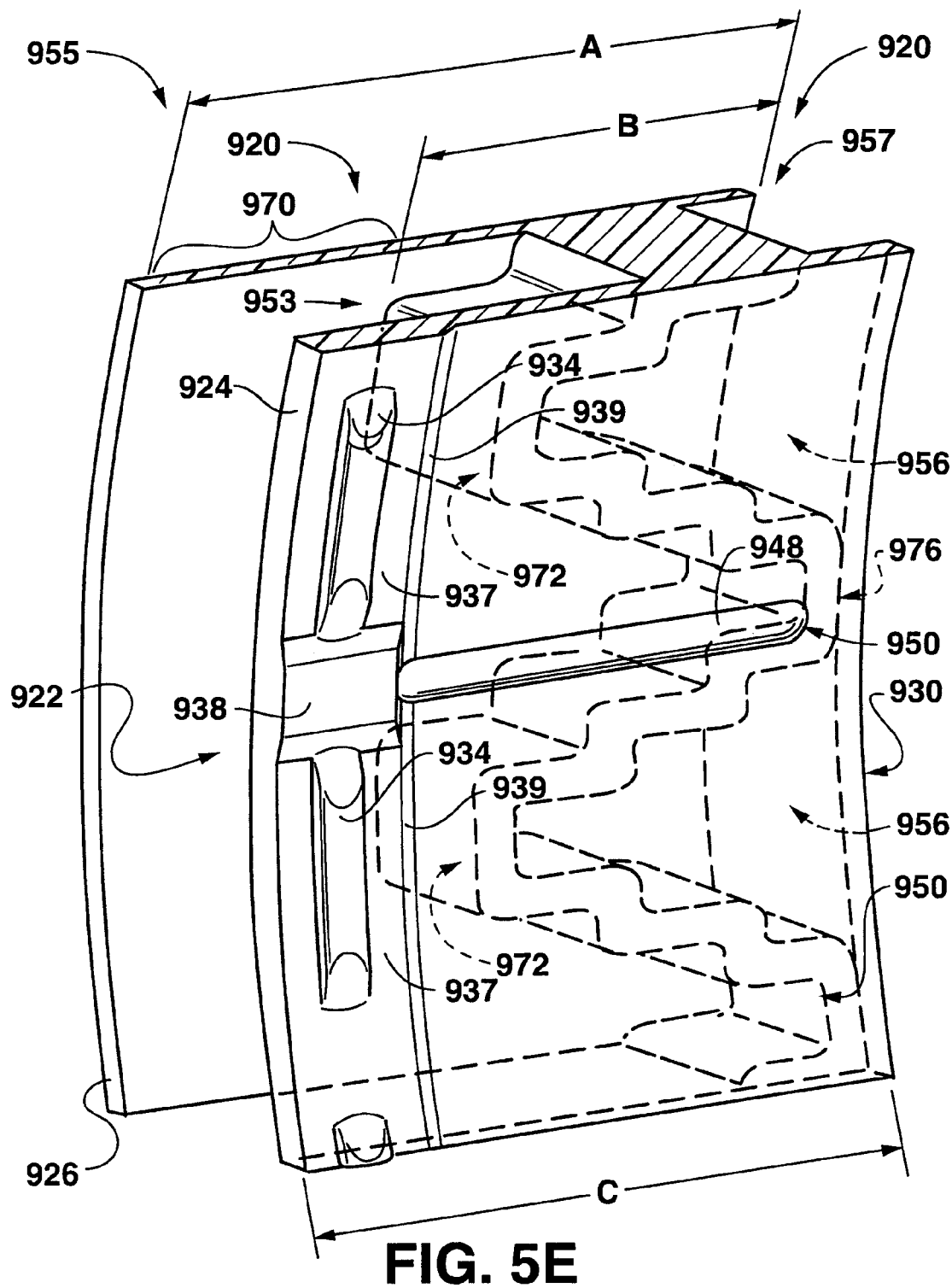
FIG. 5E is a perspective and close-up view of a section of an exemplary embodiment of the present invention, illustrating a radially inner-surface of this embodiment as viewed from the outboard side.

In still another exemplary embodiment of the present invention, support ring 920 as illustrated in FIG. 5E also contains a plurality of protuberances 934 and a plurality of tabs 938. Each individual tab is located at least partially between a pair of protuberances 934. In a fashion similar to support ring 420 of FIG. 2E, tabs 938 are equally spaced about the circumference of support ring 920 and are not positioned between every pair of protuberances 934. The axial width A of cylindrical cap 926 is about equal to the axial width C of cylindrical base 924. An integrated shelf portion 970 is created by the extension in the outboard direction of cylindrical cap 926 to a greater axial width A than the axial width B of cylindrical body 922. Therefore, as previously discussed, for certain applications the present invention includes embodiments where the brackets or braces may be eliminated to further decrease the weight. However, using the teachings disclosed herein, one of ordinary skill in the art will understand that brackets could be added to support ring 820 or support ring 920 if necessary and such modification falls with the spirit of the invention and the scope of the claims that follow.

Finally, using the teachings disclosed herein, variations can be used to tune or optimize the run-flat support ring for the specific application under consideration while also providing a support ring that is more readily mounted and dismounted from the rim and still functioning to support the tread strip region during reasonable vehicle operation in period of low or zero inflation pressure. It should be appreciated by those skilled in the art that modifications and variations can be made to the support ring as described herein, without departing from the scope and spirit of the claims. It is intended that the invention include such modifications and variations as come within the scope of the appended claims and their equivalents.

What is claimed is:

1. A run-flat support ring for mounting inside a tire on a wheel rim; the tire having a tread strip region; the wheel rim having an annular depression and an annular raised surface; the support ring defining an axial direction, an inboard side, and an outboard side; the support ring comprising:

a substantially cylindrical base, said base having a radially inner-most surface that includes i) a plurality of circumferentially placed protuberances configured to engage the annular depression; ii) a plurality of circumferentially placed tabs configured for engaging the wheel rim proximate to the annular depression; and iii) a plurality of circumferentially placed ribs, extending longitudinally along the axial direction, and configured for engaging the annular raised surface;

a substantially cylindrical cap, said cap configured for contact with the tread strip region in the event of a sufficient loss of air pressure; and a substantially cylindrical body connecting said base and said cap, said body having an axial width, said cap having an axial width, wherein the axial width of said cap is greater than said axial width of said body such that said cap extends in the axial direction along the outboard side of the support ring.

2. A run-flat support ring as in claim 1, further comprising a plurality of brackets extending between said cap and the outboard side of said body.

3. A run-flat support ring as in claim 2, wherein said base has an axial width that is less than said axial width of said cap.

4. A run-flat support ring as in claim 2, wherein said base has an axial width that is greater than said axial width of said body.

5. A run-flat support ring as in claim 2, the support ring defining a circumferential direction, said body further comprising a plurality of wall members having a plurality of outboard surfaces, said wall members being connected to said brackets at said outboard surfaces, said outboard surfaces have a width along the circumferential direction, said brackets have a width along the circumferential direction, wherein said width of said brackets is about equal to said width of said outboard surfaces.

6. A run-flat support ring as in claim 1, wherein said tabs are located at least partially between said protuberances.

7. A run-flat support ring as in claim 1, wherein said tabs are rectangular in shape.

8. A run-flat support ring as in claim 1, wherein said ribs are located axially adjacent to, and inboard of, said tabs.

9. A run-flat support ring as in claim 1, wherein said protuberances are about 1.7 mm or less in height relative to said radial inner-most surface.

10. A run-flat support ring as in claim 1, wherein said plurality of circumferentially placed ribs is comprised of about 8 to 12 said ribs, spaced circumferentially about said radially inner-most surface.

11. A run-flat support ring for mounting on a wheel rim inside a tire to support a tread strip region of the tire in the event of a loss of inflation pressure, the wheel rim defining an axis about which rotation occurs during operation, the wheel rim also defining an axial direction and a circumferential direction, the wheel rim having an annular recess and a seat for the support ring that includes an outboard bearing surface and an inboard bearing surface, wherein the inboard bearing surface is located at a greater radial distance from the axis than the outboard bearing surface, the support ring comprising:
a base configured for placement around the wheel rim, said base defining a clip that is longitudinally oriented along the circumferential direction, said clip configured for positioning into the annular recess of the wheel rim, said clip having at least one discontinuity along the circumferential direction;
a cap configured for contact with the tread strip region in the event of a sufficient loss of air pressure; and
a plurality of wall members extending in a radial direction between said base and said cap, wherein each said wall member has an axial width, said cap has an axial width, and wherein said axial width of each said wall member is less than said axial width of said cap such that said cap provides a shelf portion extending away from said wall members.

12. A run-flat support ring as in claim 11, further comprising a plurality of braces extending between said shelf portion and said plurality of wall members.

13. A run-flat support ring as in claim 12, wherein said base has an axial width that is less than said axial width of said cap.

14. A run-flat support ring as in claim 12, wherein said base has an axial width that is greater than said axial width of each of said plurality of wall members.

15. A run-flat support ring as in claim 12, wherein each said wall member defines an outermost surface on the outboard side of the support ring, each said brace having a width along the circumferential direction, each said outermost surface having a width along the circumferential direction, wherein said width of said braces is substantially equal to said width of said wall members.

16. A run-flat support ring as in claim 12, wherein said base further comprises a plurality of rotation resisting surfaces configured for contacting said wheel rim adjacent to the annular recess of the wheel rim.

17. A run-flat support ring as in claim 16, wherein each of said rotation resisting surfaces is about 1.7 mm or less in height.

18. A run-flat support ring as in claim 16, wherein said base further comprises a plurality of ribs oriented longitudinally in the axial direction, and configured for contact with the wheel rim along the inboard bearing surface.

19. A run-flat support ring as in claim 18, wherein each of said plurality of ribs has an inboard end that is curvilinear in shape.

20. A run-flat support ring as in claim 19, wherein each of said plurality of ribs is about 1.2 mm or less in height.

21. A run-flat support ring as in claim 11, wherein said substantially cylindrical base further comprises:
a plurality of rotation resisting surfaces configured for contacting said the rim adjacent to the annular recess; and
a plurality of ribs oriented longitudinally in the axial direction, positioned on said substantially cylindrical base inboard of and adjacent to said plurality of rotation resisting surfaces, and configured for contact with the wheel rim along the inboard bearing surface.

22. A run-flat support ring for mounting on a wheel rim within a tire, the wheel rim having a groove located circumferentially about the outer surface of the wheel rim, the support ring comprising:
a substantially inextensible, circular body, configured for mounting upon the wheel rim;
said body including a radially inner-most component that defines multiple raised segments, configured for placement within the groove of the wheel rim, wherein said raised segments each have a longitudinal axis that is oriented circumferentially along said radially inner-most component and are separated from one another by a predetermined distance;
said body including a radially outer-most component configured for contact with the tire during run-flat operation;
said body including a plurality of wall members between said radially inner-most component and said radially outermost component, each said wall member having an axial width, said radially outermost component having an axial width greater than said axial width of said wall members; and
a plurality of braces extending between an outboard side of said wall members and said radially outermost component.

23. A run-flat support ring for mounting on a wheel rim within a tire as in claim 22, further comprising a plurality of rotation-resisting surfaces defined by said radially inner-most component and individually located at least partially between two of said raised segments.

24. A run-flat support ring for mounting on a wheel rim within a tire as in claim 23, the support ring defining an axial direction, the support ring further comprising a plurality of ribs positioned upon said radially inner-most component, each of said ribs extending from one of
said plurality of rotation-resisting surfaces, and each of said ribs being longitudinally oriented along the axial direction.

25. A run-flat support ring as in claim 24, wherein each of said rotation-resisting surfaces is substantially rectangular in shape.

26. A run-flat support ring as in claim 25, wherein each of said ribs has at least one end that is curvilinear in shape.

27. A run-flat support ring as in claim 26, wherein said raised segments are about 1.7 mm or less in height relative a surface of said radial inner-most component.

28. A run-flat support ring as in claim 27, wherein said plurality of circumferentially placed ribs is comprised of about 8 to 12 said ribs, spaced circumferentially about said radially innermost component.

29. A run-flat support ring as in claim 28, wherein said predetermined distance is at least about 10 mm.

* * * * *